United States Patent [19]

Fisher et al.

[11] Patent Number: 5,194,516
[45] Date of Patent: Mar. 16, 1993

[54] PROCESS FOR MODIFYING VISOSITY OF ETHYLENE COPOLYMERS

[75] Inventors: John R. Fisher, Hockessin; Jerald R. Harrell; Wolfgang Honsberg, both of Wilmington, all of Del.; John W. Paul, Beaumont, Tex.

[73] Assignee: E. I. Du Pont de Nemours and Company, Wilmington, Del.

[21] Appl. No.: 769,603

[22] Filed: Oct. 1, 1991

[51] Int. Cl.$^5$ .................... C08F 220/12; C08F 6/26
[52] U.S. Cl. .................... 525/387; 522/100; 522/102; 525/329.5; 525/329.7; 525/330.1; 525/330.3; 525/333.7; 526/329; 526/329.7; 526/348; 526/348.8; 526/491
[58] Field of Search .................... 525/387; 528/491; 526/329; 522/100, 102

[56] References Cited

U.S. PATENT DOCUMENTS

| | | | |
|---|---|---|---|
| 3,875,134 | 4/1975 | Morikawa | 526/66 |
| 3,884,857 | 5/1975 | Ballard et al. | |
| 3,988,509 | 10/1976 | Ballard | 528/491 |
| 4,987,199 | 1/1991 | Takao et al. | |
| 5,028,674 | 7/1991 | Hatch et al. | |
| 5,057,593 | 10/1991 | Marshall et al. | |

OTHER PUBLICATIONS

F. W. Billmeyer, "Textbook of Polymer Science", 3rd ed., 51 (1984) Wiley (New York).
Encyclopedia of Polymer Science and Technology, vol. 5, Interscience, New York, 1966, p. 443-444.

*Primary Examiner*—Joseph L. Schofer
*Assistant Examiner*—Fred Zitomer

[57] ABSTRACT

The viscosity of copolymers of a) ethylene and $C_1$–$C_8$ acrylate or methacrylates or b) ethylene, vinyl esters of $C_1$–$C_4$ carboxylic acids, and another comonomer selected from the group consisting of carbon monoxide, acrylic acid, methacrylic acid, or a glycidyl ester of acrylic or methacrylic acid is increased, while maintaining gel content at a level of less than 3%, by treatment with a free radical generating agent.

12 Claims, No Drawings

PROCESS FOR MODIFYING VISOSITY OF ETHYLENE COPOLYMERS

FIELD OF THE INVENTION

This invention relates to a process for increasing the viscosity of ethylene/alkyl ester copolymers.

BACKGROUND OF THE INVENTION

Ethylene/alkyl ester copolymers are well-known in the art and a large number of such copolymers are available commercially, for example ethylene/methyl acrylate and ethylene/ethyl acrylate copolymers. In the past one of the problems associated with continuous processes for preparation of such compositions in stirred tank reactors was the tendency for large amounts of polymeric deposits to form on the inner walls of the reactors. This buildup, which consists of highly crosslinked insoluble polymer, i.e. gel, adversely affected operation of the reactor. In addition, particles of the gel were invariably introduced into the product which tended to compromise the quality of the copolymer produced. It has recently been found that this problem can be alleviated by performing the copolymerization in the presence of small amounts of methanol or acetone, as disclosed in U.S. Pat. No. 5,028,674 and U.S. Pat. No. 5,057,593. Due to the chain transfer activity of methanol and acetone, however, in some cases the polymeric products thus obtained are of extremely low viscosity, so low in fact that they are unsuitable for many applications.

Methods are known for increasing the viscosity of ethylene/acrylic acid ester copolymers, for example by partial crosslinking, as disclosed in U.S. Pat. No. 4,987,199, but these prior art methods result in the formation of substantial amounts of gel in the product. An in-line process for reducing melt index is also known and is disclosed in U.S. Pat. No. 3,988,509. However, use of that process can result in nonhomogeneous distribution of highly crosslinked gel in the polymer matrix. In addition, there are safety concerns associated with the use of in-line addition of highly reactive species such as peroxides in process streams wherein the possibility exists that polymer movement through the treatment zone can be stopped due to a process upset resulting in localized heating and polymer decomposition.

There is thus a need in the art for a method whereby the viscosity of ethylene/alkyl ester copolymers can be increased without concomitantly raising the gel content of the polymer or producing products which contain domains of highly crosslinked gel within the polymer matrix.

SUMMARY OF THE INVENTION

In particular, the present invention relates to a process for increasing the viscosity of a copolymer selected from the group consisting of copolymers a) ethylene and a comonomer selected from the group consisting of $C_1$–$C_8$ alkyl esters of acrylic acid and $C_1$–$C_8$ alkyl esters of methacrylic acid, and b) ethylene, a vinyl ester of a $C_2$–$C_4$ carboxylic acid, and another comonomer, wherein the other comonomer is carbon monoxide, acrylic acid, methacrylic acid, or a glycidyl ester of acrylic or methacrylic acid, said copolymer having a melt index of 20-150 g/10 minutes, which comprises treating said copolymer with a free radical generating agent in an amount sufficient to decrease the melt index of the copolymer to 0.1-15 g/10 minutes while producing a copolymer product having a gel content of less than 3% as determined by measurement of % insolubles in boiling xylene.

The invention is further directed to copolymers of ethylene and $C_1$–$C_8$ alkyl acrylates, or $C_1$–$C_8$ methacrylates, and to copolymers of ethylene, vinyl esters of $C_2$–$C_4$ carboxylic acids, and comonomers selected from the group consisting of carbon monoxide, acrylic acid, methacrylic acid, and glycidyl esters of acrylic or methacrylic acid wherein the level of residual acrylate, methacrylate, or vinyl ester comonomer is substantially reduced.

DETAILED DESCRIPTION OF THE INVENTION

The copolymers suitable for viscosity modification by the process of the invention are either a) copolymers of ethylene and $C_1$–$C_8$ alkyl esters of acrylic or methacrylic acid, or b) copolymers of ethylene, a vinyl ester of a $C_2$–$C_4$ carboxylic acid, and a third comonomer selected from the group consisting of carbon monoxide, acrylic acid, methacrylic acid, or glycidyl esters of acrylic or methacrylic acid. The ethylene content of the copolymers ranges from about 95–45 mole %, preferably 85–55 mole %. Melt indexes of these copolymers are within the range of 20–150 g/10 minutes, preferably 20–80 g/10 minutes, most preferably 20–50 g/10 minutes, as determined by ASTM Method D1238, 190° C./2.16 kg weight (Condition E). Such copolymers are generally prepared by continuous copolymerization of ethylene and the alkyl or vinyl ester comonomers in a stirred reactor in the presence of at least one free-radical initiator at temperatures of from about 120° C. to 300° C. and at pressures of from about 130 to 310 MPa. The most effective initiators have half lives of 0.1-1.0 seconds at the reactor temperature, for example, lauryl peroxide, di-t-butyl peroxide, t-butyl peracetate, di(sec-butyl)peroxy dicarbonate, t-butyl peroxy neodecanoate, and t-amyl peroxy pivalate. Most preferably the copolymers are also prepared in the presence of about 2-25 weight percent methanol or acetone so that reactor fouling is decreased or eliminated.

Representative examples of copolymers suitable for use in the practice of the invention include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, ethylene/methyl acrylate/carbon monoxide, ethylene/methyl acrylate/ethyl hydrogen maleate, ethylene/butyl acrylate/carbon monoxide, ethylene/butyl acrylate/glycidyl methacrylate, ethylene/butyl acrylate/acrylic acid, ethylene/vinyl acetate/carbon monoxide, ethylene/vinyl acetate/glycidyl methacrylate, ethylene/vinyl acetate/methacrylic acid, ethylene/vinyl butyrate/carbon monoxide, ethylene/vinyl propionate/glycidyl methacrylate, and ethylene/vinyl acetate/acrylic acid. Preferably the copolymers contain copolymerized units of $C_1$–$C_8$ alkyl acrylates or methacrylates.

According to the process of the invention, the viscosity of the above-described ethylene/ester copolymers is modified by the action of a free radical generating agent. Free radical generation can be carried out in a number of known ways, for example, through action of a chemical agent, such as an organic peroxide, or through the action of electron beam irradiation. Representative examples of organic peroxides include dicumyl peroxide, t-butyl perbenzoate, benzoyl peroxide, t-butyl peracetate, 1,1-di(t-butylperoxy)3,3,5-trimethyl cyclohexane, 2,5-dimethyl-2,5,di-(t-butylperoxy)hexane, 2,5-dimethyl-2,5,di-(t-butylperoxy)hexyne, and n-butyl-4,4-bis(t-butylperoxy valerate). Use of a combination of more than one peroxide is advantageous in certain circumstances, although generally one peroxide is used alone.

The amount of peroxide used in the process of the invention is that which will reduce the melt index of the starting copolymer to a value of 0.1–15 g/10 minutes without increasing the gel content of the polymer to above 3% as determined by measurement of % insolubles in boiling xylene. This melt index range is necessary for the product to find use as a general purpose elastomer or in coatings and adhesive applications. The exact quantity necessary will depend on the viscosity of the untreated copolymer and the degree of viscosity increase which is desired. Generally a melt index of 1–10 g/10 minutes, or a Mooney Viscosity of about 12–25, is desirable in copolymers used as general purpose elastomers. Depending on the reactivity of the particular organic peroxide selected, quantities of 0.5–10 parts peroxide per 100 parts polymer, preferably 1–7 parts per 100 parts polymer, most preferably 1–4 parts peroxide, are generally adequate to reduce viscosity to this range. Selection of the exact quantity of peroxide for use with a particular polymer to achieve a target melt index requires only routine experimentation and is within the skill of the art.

Viscosity of the copolymers may also be modified by exposure to electron beam irradiation. The dosage generally ranges from 1–8 Mrads, preferably 3–8 Mrads. The interaction of high energy electrons generates excited states leading to the formation of polymeric free radicals. These radicals react resulting in branched chains and an increase in polymer viscosity. Electron beams are conventionally generated by commercial electron accelerators, for example the Dynamitron ® accelerator, produced by Radiation Dynamics Corporation.

A coagent may optionally be added to the copolymer composition to enhance the efficiency of the free radical generating agent. Such compounds include triallyl cyanurate, triallyl isocyanurate, diallyl maleate, high vinyl low molecular weight butadiene, N,N'-m-phenylene dimaleimide, pentaerythritol triacrylate, pentaerythritol trimethacrylate, trimethylolpropane triacrylate, and trimethylolpropane trimethacrylate. Use of such coagents in free radical generation processes is well-established in the art.

In addition, various other ingredients commonly used in copolymer compounding may be added to the copolymer peroxide blend before the viscosity modification process takes place. Such additives include fillers, small amounts of plasticizers and processing aids.

The viscosity modification process of the present invention is performed by either blending a free radical generating chemical agent with the above-described ethylene copolymers and heating the blend to a temperature at which free radical generation occurs, or by exposing the copolymer to electron beam irradiation. Although it is possible to perform the process as a separate step during copolymer synthesis, for example, just prior to isolation, it is preferable to use already-isolated ethylene copolymers as the starting material for the process.

In those situations wherein the free radical generating agent is a chemical agent, in particular a peroxide, it is possible to carry out the viscosity modification process under either dynamic or static conditions. Under dynamic conditions the copolymer is subjected to mechanical shear at elevated temperatures, whereas under static conditions no shearing force is applied. The dynamic process may take place in an internal mixer, for example a Brabender Plastograph ®, Haake Rheocord ® mixer, or a Banbury mixer. The static process would be carried out most often in an oven.

Both one-step and two-step processes are compatible with viscosity modification under dynamic conditions. One-step processes may be carried out on a small scale in, for example, a Brabender Plastograph ® or a Haake Rheocord ® mixer, by heating the mixing cavity to a temperature at which peroxide decomposition will occur. Copolymer, peroxide, and processing aids are then introduced to the mixer and the components are blended for a time sufficient to raise the temperature of the polymer to the decomposition point of the peroxide and to decompose the peroxide. On a large scale, the heat necessary to raise the temperature of the batch to the desired level is usually derived only from the mechanical shearing of the polymer, although in some cases external heating may be necessary. For example, when a Banbury mixer is used, the copolymer, peroxide and processing aids are charged to the mixer and blended at high speed until the desired temperature is achieved. Mixing is then continued for a time sufficient to decompose essentially all of the peroxide. In a two-step process peroxide is mixed into the copolymer on a two-roll mill or in an internal mixer under conditions which will not lead to decomposition of the peroxide. Viscosity modification is then effected by subjecting the polymer/peroxide blend to a shearing force at elevated temperature using an extruder, an internal mixer, or a similar device. The one-step process is generally the preferred method of operation.

The static process is by nature a two-step operation. The copolymer, peroxide, and processing aids are combined on a two-roll mill or in a mixer at a temperature below the decomposition point of the peroxide. The blend is then placed in a hot air or microwave oven set at an elevated temperature. The static process can be performed either continuously or in a batch-wise manner.

When viscosity modification is performed through the action of electron beam irradiation a two-step process under static conditions is used.

An important feature of the invention is that the process does not result in formation of substantial quantities of gel. Specifically, under the conditions of the invention gel levels in the ethylene copolymer product of no more than 3%, usually no more than 1%, are obtained. The presence of high levels of gel can result in roughness of extrudates, poor electrical properties, and lower adhesion. Gel level in the product is determined by measurement of % insolubles in boiling xylene according to the following procedure.

A one gram sample is cut into small pieces of approximately 1 mm$^3$ and weighed to four decimal places. The sample is placed in a 300 ml flask containing 150 ml xylene and fitted with a reflux condenser and nitrogen bleed. The mixture is heated under reflux for 3 hours and then cooled to room temperature and shaken for 30 minutes on a platform shaker at a rate of approximately 185 cycles/minute. The contents of the flask are filtered through a 120 mesh stainless steel screen which has been preweighed to four decimal places. The flask is rinsed three times with 25 ml aliquots of xylene and the rinses are filtered through the screen. The screen is dried at 90°-100° C. for 30 minutes in a vacuum oven at approximately ⅓ atmosphere (0.034 MPa) and reweighed. The amount of boiling xylene insolubles is calculated using the following formula:

$$\text{Insolubles(wt \%)} \left( \frac{wt_{(s+i)} - wt_s}{wt_o} \right) \times 100$$

where
$wt_{(s+i)}$=Weight of Screen After Drying
$wt_s$=Original Weight of Screen
$wt_o$=Original Weight of Polymer Sample In those cases wherein the crystallinity of the ethylene copolymers is high, i.e. the ethylene content of the copolymer is, for example, above about 90 mole %, the copolymers are not completely soluble in cold xylene. During the cooling stage of the above procedure such copolymers tend to precipitate, thus introducing error in the measurement of % gel. In such cases the filtration step must be done while the temperature of the xylene solution is above 100° C.

Polymers prepared by the process of the invention are useful in the fabrication of adhesives, gaskets, seals, hose, tubing, vibration dampers, and coating compositions, including wire coatings. Because of their low gel content the copolymers are particularly suited for preparation of semiconductive wire coverings, adhesives, and coating compositions.

A further advantage of the process of the invention is that it promotes reduction of the level of residual comonomer, particularly alkyl acrylate and alkyl methacrylate, in the ethylene copolymer product. In general the level of residual conomomer in the ethylene copolymers prior to treatment by the process of the invention is in the range of 2,000-5,000 ppm. Preferably the product produced by the process contains less than 800 ppm, more preferably less than 500 ppm, and ideally, less than 50 ppm residual comonomer.

The invention is further illustrated by reference to the following examples wherein all parts are by weight unless otherwise specified.

EXAMPLES

The following test methods were used to determine properties of the polymers used in the examples:

Melt Index ASTM D1238, 190° C./2.16 kg weight (Condition E).

Mooney Viscosity ASTM D1646, 100° C., 1 minute preheat, viscosity measured at 4 minutes.

EXAMPLE 1

A 100 g sample of a copolymer of ethylene, methyl acrylate, and ethyl hydrogen maleate (wt. ratio 37.6/54.4/4.0, melt index 70.8 g/10 minutes, measured on a sample which had been dried in a vacuum oven for 20 minutes at 150° C.; 0.01% gel) was blended with 3.8 g of Luperco 231XL peroxide [40% 1,1-di(t-butylperoxy)3,3,5-trimethyl cyclohexane on an inert support] and 1 g Vanfre VAM (a complex organic alkyl acid phosphate processing aid), on a two-roll rubber mill at toom temperature. A sample of the milled blend was subjected to dynamic mixing under the following conditions. 55 g of the blend was charged to a small electrically heated Brabender Plastograph ®. The mixer temperature was set at 160° C. with the rotor speed being 40 RPM. After the blend was charged the ram was lowered and the temperature of the blend gradually increased. Mixing continued for 4 minutes after the polymer temperature reached approximately 160° C., total mixing time being 8.5 minutes. The polymer, which had an internal temperature of 162° C., was then removed. The dynamically mixed blend had a melt index of 9.1 g/10 minutes and a gel content of 0.02%

A further sample of the above-described milled blend was heated under static conditions as follows. A 25 g sample of the milled blend, 8.25×3.81 .0.64 cm (3¼"×1½"×¼") was folded over a Type J thermocouple and placed in a 170° C. oven. The sample was held in the oven for 4 minutes after the thermocouple registered a temperature of 160° C.; total time in the oven was 20 minutes. The melt index of the treated sample was found to be 8.9 g/10 minutes and the gel content was 0.22%.

This example illustrates that under both dynamic and static conditions melt index of ethylene copolymers can be dramatically reduced with minimal increase in gel content when the copolymers are treated using the process of the invention.

EXAMPLE 2

A copolymer of ethylene and methyl acrylate, (methyl acrylate content 58.6 wt. %, melt index 87.3 g/10 minutes, measured on a sample which had been dried in a vacuum oven for 20 minutes a 150° C.; gel content of 0.03), was treated with peroxide in a F80 Banbury mixer fitted with ST rotors as follows. 50 parts of the polymer was charged to the mixer, followed by addition of 1 part Vanfre VAM and 3.3 parts Luperco 231XL peroxide, and then a further 50 parts polymer. The batch size was 140 lbs.(63.6 kg). The ram was lowered and the batch was mixed at 95 RPM. The mechanical shearing of the polymer gradually raised the temperature of the batch. At the point at which the batch temperature increased from approximately 107° C. to 132° C., volatiles, mainly moisture, were vented. When the temperature reached 154° C., the rotor speed was reduced to 50 RPM and mixing was continued for 3 minutes. Total mixing time was 9.3 minutes. At the end of this period the batch was discharged onto a two roll-drop mill and sheeted off. The product had a melt index of 1.1 g/10 minutes (Mooney viscosity 25) and a gel content of 0.01%. Redisual methyl acrylate monomer content, originally 3400 ppm, was reduced to a level of 4 ppm in the product.

EXAMPLE 3

The procedure described above in Example 2 was repeated except that the copolymer had a methyl acrylate content of 69.6 wt. %, a melt index of 75 g/10 minutes, and a gel content was 0.02, and 3.24 parts of Luperco 231XL peroxide was used in place of 3.3 parts. Total mixing time was 13.3 minutes. The melt index of the product was 2.6 g/10 minutes (Mooney viscosity 22.6) and the gel content was 0.02%. Residual methyl acrylate monomer content, originally 13,000 ppm, was reduced to a level of 4 ppm in the product.

EXAMPLE 4

A series of copolymers of ethylene, methyl acrylate, and ethyl hydrogen maleate having varying compositions and melt indices were treated with Luperco 231 XL peroxide in the presence of Vanfre VAM using the same equipment and substantially the same procedure and amounts of ingredients as described in Example 2. Table I shows composition, process, and product data for these samples.

TABLE I

| Sample | Melt* Index Starting Material | Melt* Index Product | % Gel Starting Material | % Gel Product | Parts Peroxide | Cycle Time* |
|---|---|---|---|---|---|---|
| 1 | 101.0 | 6.1 | 0.08 | 0.01 | 7.1 | 11.3 |
| 2 | 72.5 | 6.0 | 0.01 | 0.02 | 3.6 | 9.2 |
| 3 | 71.1 | 0.24 | 0.01 | 0.47 | 5.0 | 8.3 |
| 4 | 31.0 | 7.7 | 0.13 | 0.08 | 2.3 | 8.1 |

Sample 1: Ethylene/methyl acrylate/ethyl hydrogen maleate copolymer, wt. ratio 30/64.8/5.2
Samples 2 and 3: Ethylene/methyl acrylate/ethyl hydrogen maleate copolymer, wt. ratio 41.6/54.3/4.1
Sample 4: Ethylene/methyl acrylate/ethyl hydrogen maleate copolymer, wt. ratio 38.5/57.3/4.2
*Melt Indices in g/10 minutes, cycle time in minutes.

The levels of residual methyl acrylate monomer in samples 1 and 2 before treatment by the process of the invention were 9300 and 3800 ppm, respectively. Following treatment the levels were reduced to 14 and 9 ppm, respectively.

EXAMPLE 5

Samples of Polymer 5A, a copolymer of ethylene and methyl acrylate (wt. ratio 41.4/58.6, Mooney viscosity 3.1, gel content 0.03%) and Polymer 5B, a copolymer of ethylene and methyl acrylate (wt. ratio 30.4/69.6, Mooney viscosity 4.0, gel content 0.02%) were sheeted out on a two-roll mill to provide slabs 8×16×0.25 inches (20.3×40.6×0.64 cm). Each sample was individually wrapped in polyethylene film and subjected to electron beam irradiation in that state. The effect of the radiation treatment on Mooney Viscosity and copolymer gel content is shown in Table II.

TABLE II

| Sample | Mooney Visc. Starting Material | Mooney Visc. Product | Gel Content Starting Material (%) | Gel Content Product (%) | Radiation Dose (MRads) |
|---|---|---|---|---|---|
| 5A | 3.1 | 3.1 | 0.03 | 0.03 | 0 |
| 5A | 3.1 | 9.7 | 0.03 | 0.06 | 3 |
| 5A | 3.1 | 9.8 | 0.03 | 0.06 | 4 |
| 5A | 3.1 | 18.1 | 0.03 | 0.25 | 5 |
| 5B | 4.0 | 4.0 | 0.02 | 0.02 | 0 |
| 5B | 4.0 | 17.9 | 0.02 | 0.03 | 3 |
| 5B | 4.0 | 18.8 | 0.02 | 0.02 | 4 |

The data indicate that large viscosity increases can be obtained with very little increase in gel content.

EXAMPLE 6

Samples of Polymer 6A, a copolymer of ethylene, methyl acrylate, and ethyl hydrogen maleate (wt. ratio 30/64.8/5.2, Mooney viscosity 2.5, gel content 0.08%) and Polymer 6B, a copolymer of ethylene, methyl acrylate, and ethyl hydrogen maleate (wt. ratio 41.5/54.3/4.2, Mooney viscosity 3.9, gel content 0.01%, residual methyl acrylate monomer content 3910 ppm) were sheeted out on a two-roll mill to provide slabs 8×16×0.25 inches (20.3×40.6×0.64 cm). Each sample was individually wrapped in polyethylene film and subjected to electron beam irradiation in that state. The effect of the radiation treatment on Mooney Viscosity and copolymer gel content is shown in Table III.

TABLE III

| Sample | Mooney Visc. Starting Material | Mooney Visc. Product | Gel Content Starting Material (%) | Gel Content Product (%) | Radiation Dose (MRads) |
|---|---|---|---|---|---|
| 6A | 2.5 | 2.5 | 0.08 | 0.05 | 0 |
| 6A | 2.5 | 14.3 | 0.08 | 0.02 | 6 |
| 6A | 2.5 | 16.1 | 0.08 | 0.05 | 8 |
| 6A | 2.5 | 14.4 | 0.08 | 0.10 | 8 |
| 6B | 3.0 | 3.0 | 0.01 | 0.01 | 0 |
| 6B | 3.0 | 14.8 | 0.01 | 0.01 | 5 |
| 6B | 3.0 | 12.1 | 0.01 | 0.24, 0.15 | 5 |
| 6B | 3.0 | 15.9 | 0.01 | 0.03 | 6 |
| 6B | 3.0 | 19.6 | 0.01 | 0.01 | 7 |

Residual methyl acrylate monomer content in Sample 6B was reduced from 3910 ppm to approximately 600–725 ppm by the irradiation process.

EXAMPLE 7

A 110 g sample of a copolymer of ethylene, methyl acrylate, and ethyl hydrogen maleate (wt. ratio 29.5/65.1/5.4, melt index 101 g/10 minutes, measured on a sample which had been dried in a vacuum oven for 20 minutes at 150° C.; 0.05% gel) was blended with 3.3 g of Lupersol 70 (75% t-butyl peroxy acetate in mineral spirits) and 1 g Vanfre VAM on a two roll rubber mill at room temperature to yield Blend A. Blends B and C were prepared in the same manner except that the amount of peroxide was 2.2 g and activating coagents for the peroxide were added to the blend. Blend B contained 1.1 g of trimethylol propane trimethacrylate and Blend C contained 0.55 g of triallyl cyanurate. 55 g of the blend was charged to a small electrically heated Brabender Plastograph ®. The mixer temperature was set at 175° C. with the rotor speed being 40RPM. After the blend was charged the ram was lowered and the temperature of the blend gradually increased. Mixing continued for 4 minutes after the polymer temperature reached approximately 175° C. Melt indices and % gel by the xylene insolubles method are shown in Table IV.

TABLE IV

| Composition | Blend A | Blend B | Blend C |
|---|---|---|---|
| Melt Index* | 7.9 | 2.6 | 7.1 |
| % Gel | 0.46 | 0.62 | 0.38 |

*Measured in g/10 minutes

EXAMPLE 8

A copolymer blend was prepared as described in Example 1 except that 2.7 g of Luperco 231XL was used and 0.5 g of a high vinyl polybutadiene coagent (Ricon ® 154 polybutadiene) was added to the compound. 55 g of this blend was mixed and heated in a small Brabender Plastograph ® as described in Example 1. Mixing was continued for 4 minutes after the polymer temperature reached 160° C. The dynamically mixed blend had a melt index of 6.4 g/10 minutes and a gel content of 0.2%.

What is claimed is:
1. A process for increasing the viscosity of a copolymer selected from the group consisting of copolymers of a) ethylene and a comonomer selected from the group consisting of $C_1$–$C_8$ alkyl esters of acrylic acid and $C_1$–$C_8$ alkyl esters of methacrylic acid, and b) ethylene, a vinyl ester of a $C_2$–$C_4$ carboxylic acid, and another comonomer, wherein the other comonomer is carbon monoxide, acrylic acid, methacrylic acid, or a glycidyl ester of acrylic or methacrylic acid, said copolymer having a melt index of 20–150 g/10 minutes, which comprises treating said copolymer with a free radical generating agent in an amount sufficient to decrease the melt index of the copolymer to 0.1–15 g/10 minutes while producing a copolymer product having a gel content of less than 3% as determined by measurement of % insolubles in boiling xylene.

2. The process of claim 1 wherein the copolymer is treated with a chemical free radical generating agent.

3. The process of claim 2 wherein the free radical generating agent is an organic peroxide.

4. The process of claim 1 wherein the copolymer product has a gel content of less than 1% as determined by measurement of % insolubles in boiling xylene.

5. The process of claim 1 wherein the free radical generating agent is electron beam irradiation.

6. The process of claim 1 wherein the process is carried out in the presence of a coagent.

7. The process of claim 1 wherein the copolymer is a copolymer of ethylene and a $C_1$–$C_8$ alkyl acrylate or a $C_1$–$C_8$ alkyl methacrylate.

8. The process of claim 1 wherein the copolymer is a copolymer of ethylene, vinyl acetate, and another comonomer, wherein the other comonomer is carbon monoxide, acrylic acid, methacrylic acid, or a glycidyl ester of acrylic or methacrylic acid.

9. The process of claim 5 wherein the copolymer is a copolymer of ethylene and methyl acrylate.

10. The process of claim 5 wherein the copolymer is a copolymer of ethylene, methyl acrylate, and ethyl hydrogen maleate.

11. The process of claim 3 wherein the copolymer is a copolymer of ethylene and methyl acrylate.

12. The process of claim 3 wherein the copolymer is a copolymer of ethylene, methyl acrylate, and ethyl hydrogen maleate.

* * * * *